(12) United States Patent
Myers et al.

(10) Patent No.: US 6,962,390 B1
(45) Date of Patent: Nov. 8, 2005

(54) HOLLOW BEAMS FOR INCORPORATION IN AUTOMOTIVE VEHICLE FRAMES

(75) Inventors: Adam D. Myers, Clarkston, MI (US); Oday F. Hassan, Livonia, MI (US); Michael J. Boulos, Auburn Hills, MI (US); Richard E. Jayroe, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/995,913

(22) Filed: Nov. 23, 2004

(51) Int. Cl.[7] .......................... B60K 17/00; B62D 29/04
(52) U.S. Cl. ...................... 296/205; 180/312; 180/377
(58) Field of Search .............................. 296/205, 204; 180/377, 312

(56) References Cited

U.S. PATENT DOCUMENTS

| | | | |
|---|---|---|---|
| 5,174,541 A | * | 12/1992 | Hutter et al. ............... 180/312 |
| 5,823,287 A | * | 10/1998 | Chidamparam et al. .... 180/377 |
| 5,914,163 A | * | 6/1999 | Browne ...................... 296/205 |
| 6,523,876 B1 | * | 2/2003 | Durand ....................... 296/204 |
| 2002/0195842 A1 | * | 12/2002 | Kruschhausen et al. .... 296/204 |

OTHER PUBLICATIONS

Steel Transmission Cross Member Currently Used in General Motors Vehicles.

* cited by examiner

Primary Examiner—Jason Morrow
(74) Attorney, Agent, or Firm—Laura C. Hargitt

(57) ABSTRACT

A hollow beam for incorporation in an automotive vehicle frame is useful as a transmission cross member extending between side rails of the automotive vehicle frame. The hollow beam has first and second U-shaped channels, each comprising a base wall and a pair of side walls extending transversely from the base wall. The channel members are made of a thermosetting polyester which is reinforced with glass fibers. The side walls of the second channel are received within the sidewalls of the first channel and adhered thereto with epoxy to form a rigid, relatively light weight beam. The beam has figure-8 shaped aluminum inserts proximate the ends thereof for attaching the beam to the side rails of the automotive vehicle frame.

14 Claims, 5 Drawing Sheets

HOLLOW BEAMS FOR INCORPORATION IN AUTOMOTIVE VEHICLE FRAMES

FIELD OF THE INVENTION

The present invention is directed to hollow beams for incorporation in automotive vehicle frames. More particularly, the present invention is directed to hollow beams for incorporation in automotive vehicle frames, wherein according to at least one use, the hollow beams are transmission cross members.

BACKGROUND OF THE INVENTION

Weight reduction is a goal of most manufacturers of automotive vehicles in that reductions in weight increase fuel economy which in turn reduces emissions. Weight reduction in one vehicle model results in fuel economies which are applicable to fleet wide average fuel economy helping manufacturers achieve a better corporate average fuel economy (CAFE).

A particular target for reductions in vehicle weight and fuel economy are reductions for full-size light-duty trucks and full-size light-duty sport utility vehicles. Transmission cross members for such vehicles are currently made of steel which has a relatively large specific gravity of about 7.8. Metals which are of increasing interest with respect to automotive framing components are magnesium, aluminum and titanium. While magnesium has a specific gravity of 1.74 and aluminum has a specific gravity of 2.70, both of these metals are expensive for mass production of vehicles. Moreover, magnesium requires unusual fasteners and must be protected from galvanic corrosion. Titanium has specific gravity of 4.50, however mass production is quite expensive.

In view of these considerations there is a general need for weight reduction of automotive framing members and a specific need for weight reduction of transmission cross members, wherein the weight reduction does not compromise the stiffness of the members and is achieved with reductions in expense.

SUMMARY OF THE INVENTION

A hollow beam for incorporation in an automotive frame comprises first and second channels fabricated from a glass reinforced polymer. The first and second channels are each U-shaped with the second channel having a base wall which differs from that of the first channel. The side walls of the second channel are received within the side walls of the first channel, with the surfaces of the side walls of the first and second channels being adhered to one another, and the inside surfaces of the base walls facing one another to form the hollow beam.

In a further aspect of the hollow beam, the glass reinforce polymer of the hollow beam is a thermoset polyester with chopped glass strands oriented randomly within the thermoset polyester.

In still a further aspect of the hollow beam, the hollow beam has first and second ends with metallic inserts disposed proximate the first and second ends for attaching the beams to other vehicle frame members.

In still a further aspect of the hollow beam, the metal inserts each have a pair of bores extending therein with the inserts spanning the second channel and projecting through the side walls of the second channel.

In still a further aspect of the hollow beam, the hollow beam is a transmission cross member which extends between side rails of the automotive frame.

DETAILED DESCRIPTION

Figure 1:
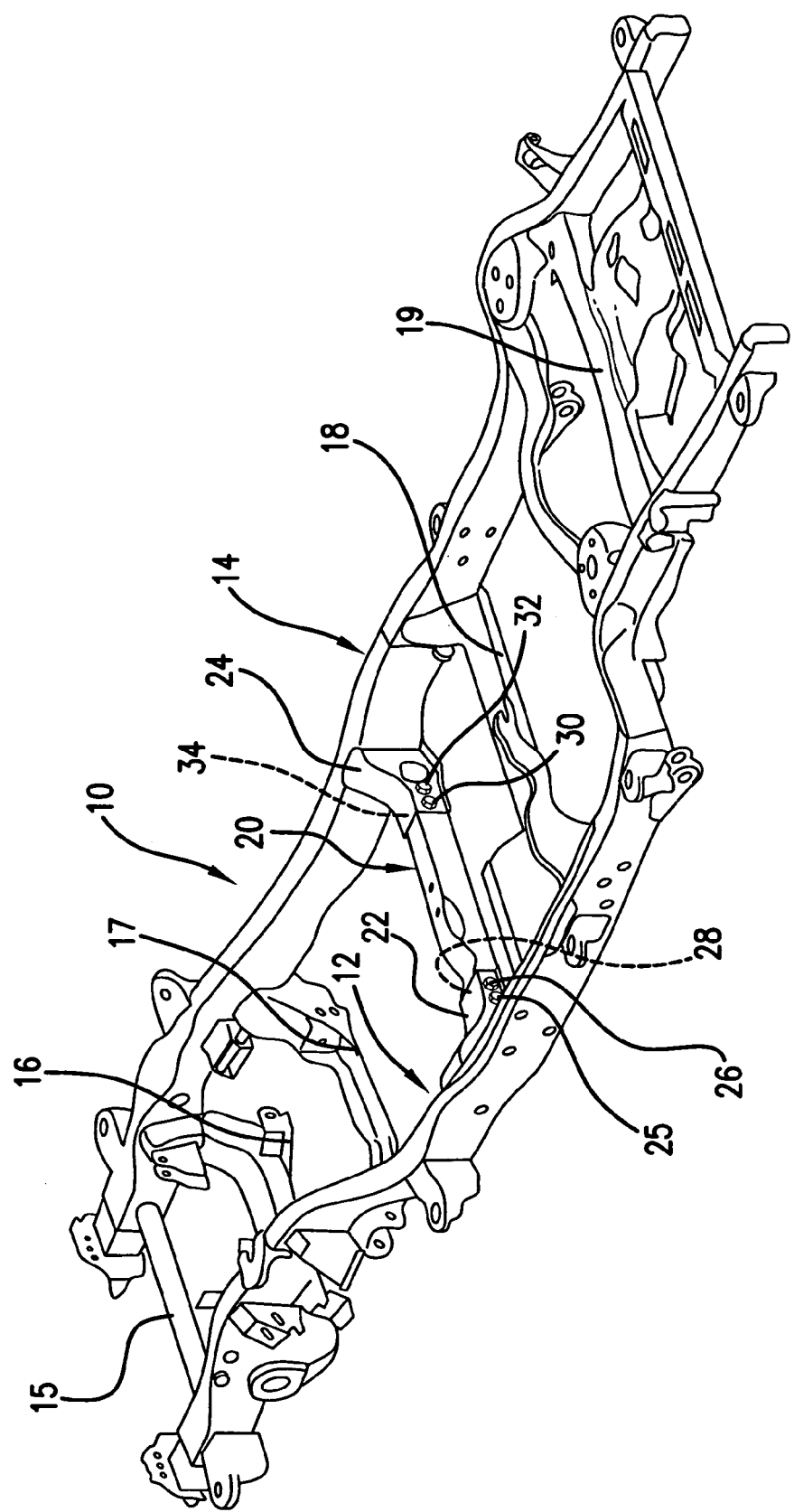
FIG. 1 is a perspective view of an automotive vehicle frame employing a beam configured in accordance with the principles of the present invention.

Referring now to FIG. 1 there is shown a frame 10 of an automotive vehicle that, for example, is a light truck or a sport utility vehicle. The frame member includes first and second side rails 12 and 14 that are joined by a plurality of the cross members, exemplified by elements 15–19, and a beam in the form of a transmission cross member 20 configured in accordance with the principles of the present invention. The transmission cross member 20 is secured to the first side rail 12 by a mounting bracket 22 and is secured to the second side rail 14 by a mounting bracket 24. The mounting bracket 22 receives bolts 25 and 26 extending through a first end portion 28 of the transmission cross member 20 while the mounting bracket 24 receives bolts 30 and 32 extending through a second end portion 34 of the transmission cross member.

Figure 2:
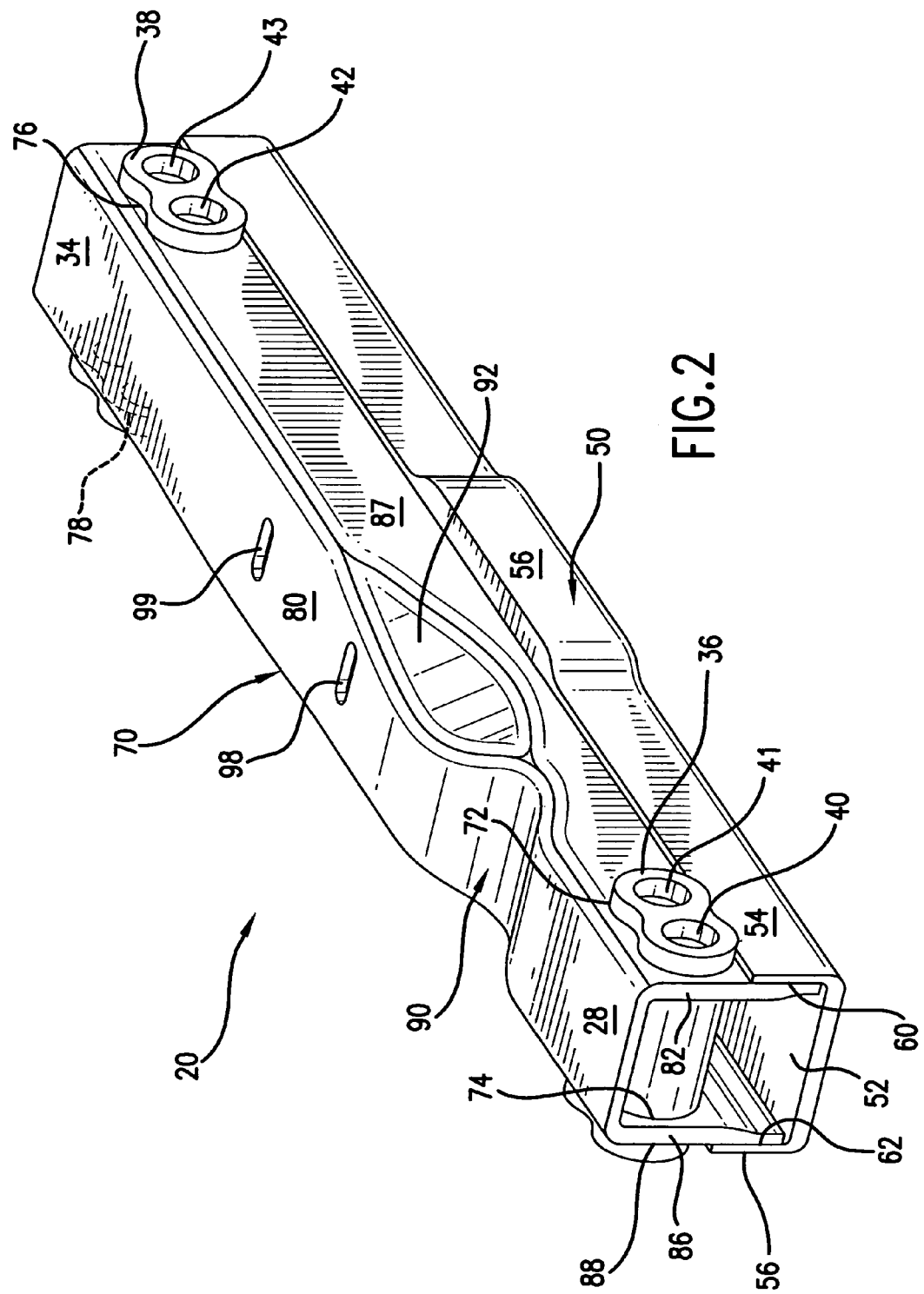
FIG. 2 is an enlarged view of a first embodiment of the beam utilized in the automotive vehicle frame of FIG. 1.

In accordance with a first embodiment of the transmission cross member 20 shown in FIG. 2, the bolts 25 and 26 of FIG. 1 pass through a first aluminum spacer pad insert 36 disposed in the first end portion 28 of the transmission cross number 20 and the bolts 30 and 32 pass through a second aluminum spacer pad insert 38 disposed in the second end portion 34 of the transmission cross member. The aluminum spacer pad inserts 36 and 38 are each unitary "figure-8" shaped inserts having bores 40, 41 and bores 42, 43, respectively, passing therethrough for receiving the bolts 25, 26 and 30, 32 of FIG. 1, respectively, to fix the transmission cross member 20 to the brackets 22 and 24.

Figure 3:
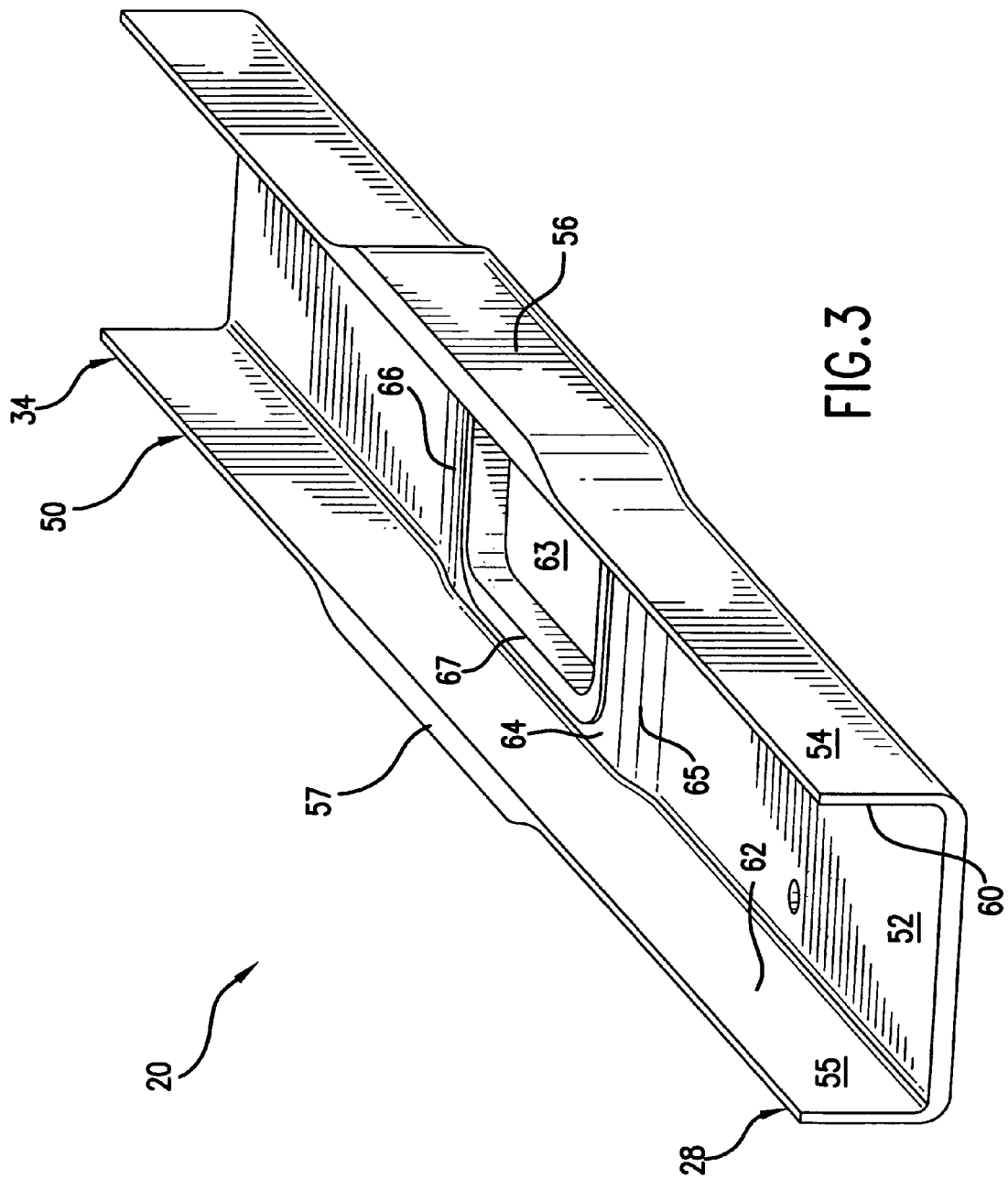
FIG. 3 is a perspective view of a first channel member which is assembled with a second channel member to configure the beams of FIGS. 1, 2 and 5.

As is best seen in FIG. 3 in combination with FIG. 2, there is shown a first channel portion 50 that forms one component of the transmission cross member 20. The first channel portion 50 has a base wall 52 of a first thickness and a first pair of side walls 54 and 55 which extend transversely, preferably perpendicular, to the base wall 52 and have a thinner cross section than the base wall. The first pair of side walls 54 and 55 have thickened portions 56 and 57 which project laterally therefrom intermediate the first and second end portions 28 and 34 of the transmission cross member 20. The first side walls 54 and 55 have inwardly facing surfaces 60 and 62 while the first base wall 52 has a rectangular opening 63 through a thickened portion 64 thereof, the thickened portion having ramps 65 and 66 sloping from the inside surface of the first base wall up to the periphery 67 of the opening. The thickened portions 56 and 57 of the first side walls 54 and 55 and the thickened portion 64 of the first base wall 52 reinforce and thus strengthen the channel portion 50 at the location of the opening 63. As will be further explained hereinafter, the first channel portion 50 is made of a glass-reinforced polymer.

Figure 4:
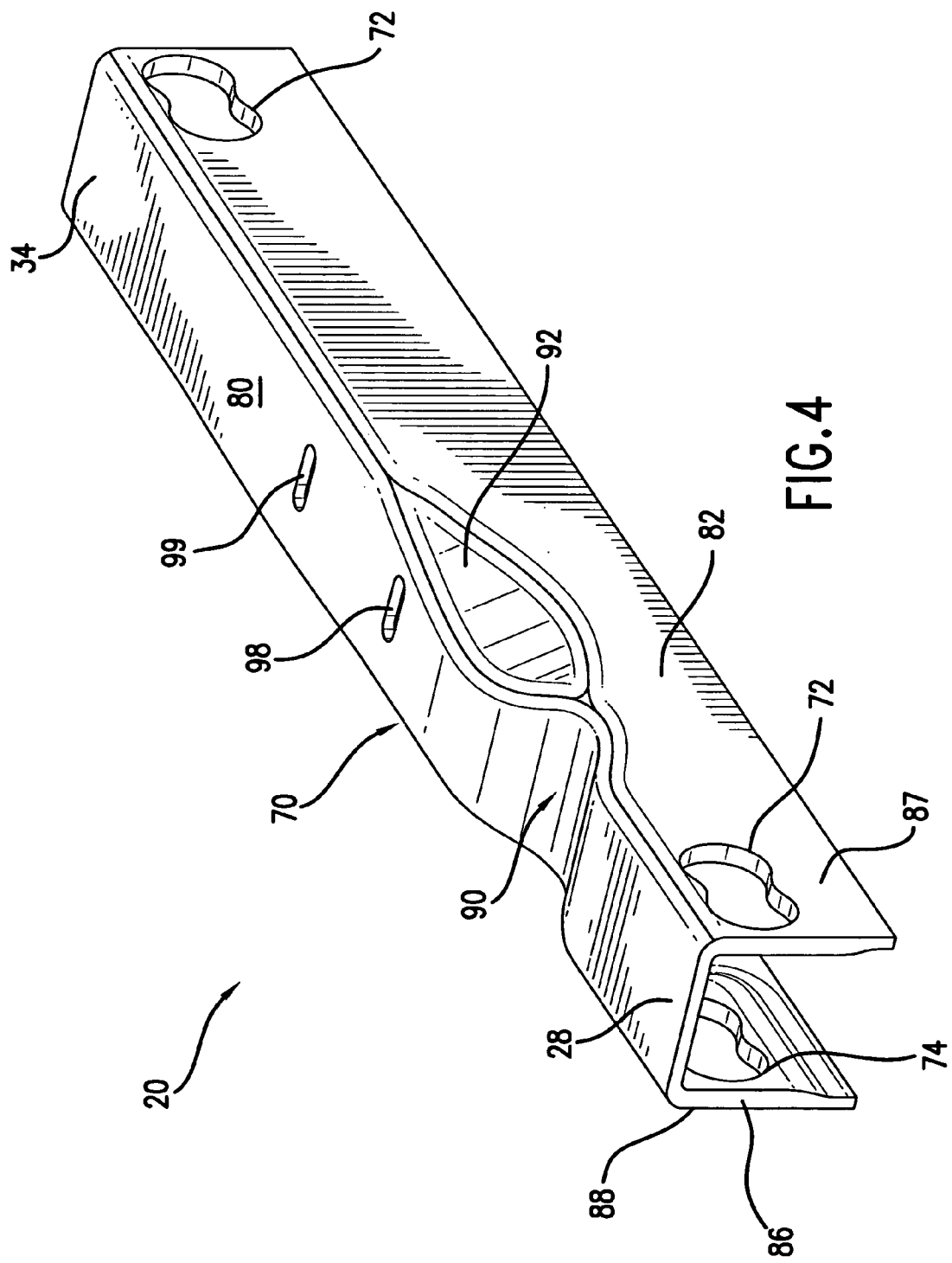
FIG. 4 is a perspective view of the second channel member which is assembled with the first channel member of FIG. 3 to configure the beams of FIGS. 1 and 2.

As is seen in FIG. 4 in combination with FIG. 2, a second channel portion 70, also fashioned from a glass reinforced polymer, provides a second component of the transmission cross member 20 and is configured to nest within the first channel portion 50. The second channel portion 70 has the "figure-8" shaped inserts 36, 38 of FIG. 2 disposed in complementary openings 72, 74 and complementary openings 76, 78 therethrough which are located proximate the end portions 28 and 34 of the second channel portion. A second base wall 80 and a pair of second side walls 82 and 86, extending transverse to and preferably perpendicular to the second base wall, provide the second channel portion 70 with an inverted U-shaped cross section. The second side walls 82 and 86 have outwardly facing surfaces 87 and 88 that abut the inwardly facing surfaces 60 and 62 of the first channel portion 50 when the first and second channel portions 50 and 70 are assembled as in FIG. 2. A permanent adhesive adheres the inwardly facing surfaces 60 and 62 of the first channel portion 50 to the outwardly facing surfaces 87 and 88 of the second channel portion 70 to form the transmission cross member 20 as a rigid, integral beam.

The second channel portion 70 has two indentations 90 and 92 therein, with the first indentation 90 being generally U-shaped and formed with gradually sloping surfaces in the second base wall 80, which indentation extends into the second side walls 82 and 86. The second indentation 92 has a tear-drop configuration and is formed at the intersection of the second base wall 80 and the first side wall 82. As is seen in FIGS. 2 and 4, the indentations 90 and 92 intersect one another with the indentation 92 being between the first indentation 90 and the second end portion 34 of the second channel portion 70 of transmission cross member 20. A pair of laterally extending slots 98 and 99 are formed through the second base wall 80 of the second channel portion 70 at a location aligned with the opening 63 in the first channel portion 50 when the first and second channel portions are assembled.

Figure 5:
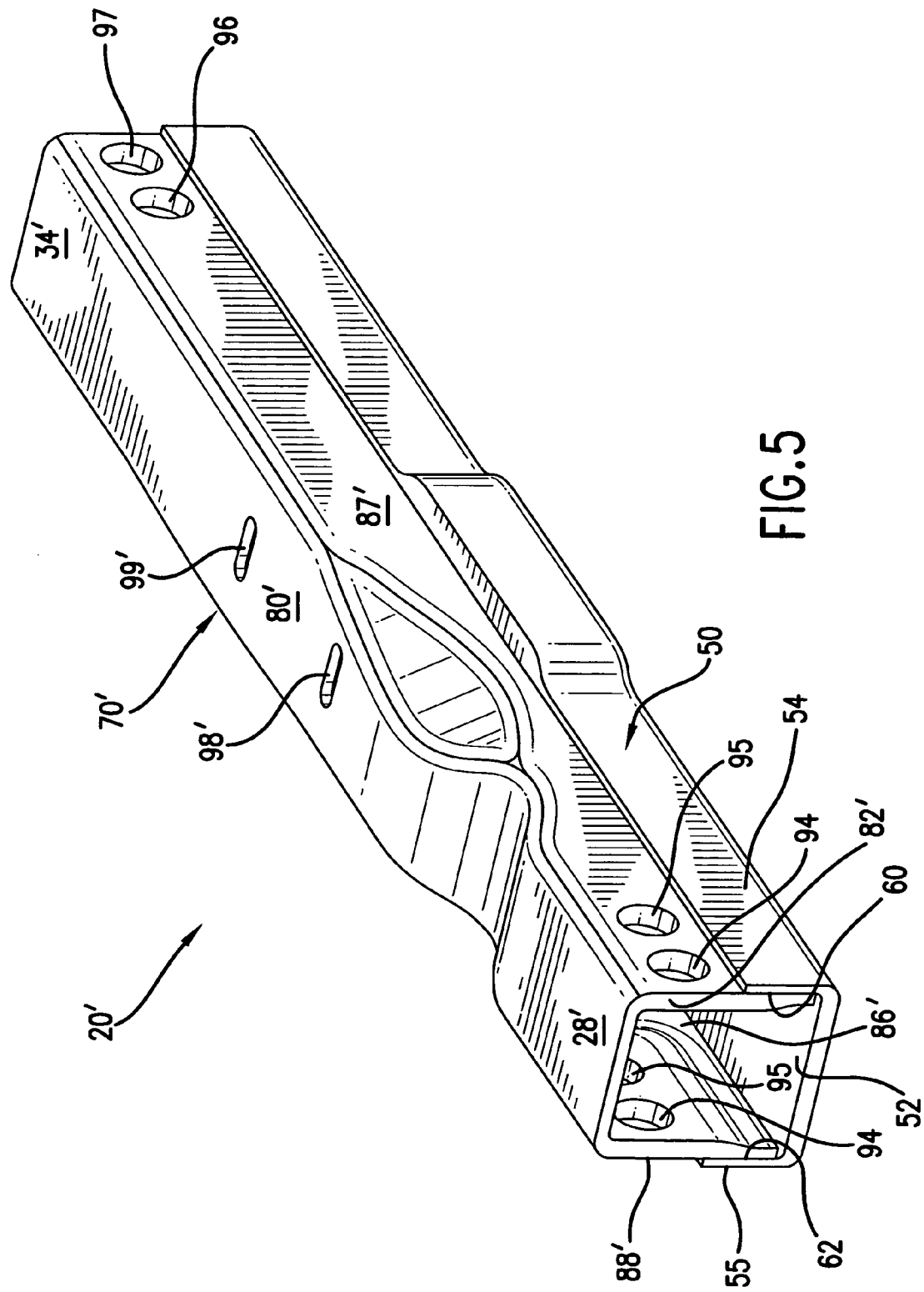
FIG. 5 is a perspective view of a second embodiment of the beam utilized in the automotive vehicle frame of FIG. 1.

Referring now to FIG. 5, where a second embodiment of the transmission cross member 20' is shown without the metallic inserts 36 and 38, pairs of adjacent holes 94, 95 and 96, 97 are disposed through the second channel portion 70' at opposite ends 28' and 34' thereof for receipt of the pairs of bolts 25, 26 and 30, 32 (see FIG. 1). The bolts 25, 26 and 30, 32 may be received through metal bushings extending through opposed holes in the pairs of adjacent holes 94, 95 and 96, 97.

The afore-discussed transmission cross member 20 illustrates a preferable use of a hollow beam construction comprising the first channel portion 50 (FIG. 4) and the second channel portion 70 or 70' (FIGS. 4 and 5), which channel portions are adhered to one another with the first channel portion 50 forming a lower portion of the beam and the second channel portion 70 forming an upper portion of the beam.

In a preferred embodiment of the invention, the composite material from which the first channel portion 50 and the second channel portion 70 or 70' are fabricated is a glass-reinforced, thermoset polyester configured from a sheet molding compound (SMC) process. The polyester is a molding compound in the form of a modified polyester engineered, structural composite (ECS) that provides high strength, fire retardant and heat resistant material. Thermoset polymers are preferred because thermoset polymers deliver more molecular structure to the material than thermoplastic polymers. Thermoset polymers do not become as pliable and plastic when exposed to temperatures close to the melting temperatures of secondary bonds, thus thermoset polyesters do not experience viscous flow when secondary bonds melt. With thermoset polyester, cross links are formed in the materials connecting the molecular chains together. Thermoset polyester is amorphous and provides a network polymer, the amorphous nature of which occurs during polymerization of the resin and hardener, with chemical curing taking place during the thermoset process.

A preferable thermoset polyester is QTC-1977 having the properties set forth in the following table:

| Property | Value |
| --- | --- |
| Specific Gravity | 1.7 |
| Glass Percentage by Wt | 50% |
| Hardness | 60 Barcol |
| Water Absorption | 0.15% |
| Shrinkage | 0.001 mm |
| Poison's Ratio | 0.384 |
| Flexural Strength | 310 MPa |
| Flexural Modulus | 14.5 GPa |
| Tensile Strength | 193 MPa |
| Tensile Modulus | 18 Gpa |
| Compression Strength | 172 Mpa |
| Izod Impact | 1350 J/m |
| Shear Modulus | 5.2GPa |
| Coefficient Linear Thermal Expansion° C. | $15 \times 10^{-6}$ |
| Thermal Conductivity | 0.35 W/mk |

The thermoset polyester is reinforced by E-glass fiber which increases the tensile strength, flexural strength, modulus and impact strength of the thermoset polyester matrix. The E-glass fiber provides reinforcement by transferring the stress under applied load from the relatively weak polymer matrix to the much stronger glass fibers because the elongation of the glass fibers is less than that of the polymer matrix. The E-glass fibers are chopped and randomly oriented in the matrix and is 50% of the sheet molding compound (SMC) by weight. The mechanical properties of the selected E-glass is set forth in the following table:

| Property | Value |
| --- | --- |
| Specific Gravity | 2.54 |
| Glass Length | 2 Inches |
| Modulus (E) | 73 GPa |
| Strength ($\sigma_y$) | 2400 Mpa |

The sheet molding compound (SMC) is a composite of glass fibers, resin and filler in an integrated ready-to-mold composition. Fabrication is accomplished by metering the thermoset polyester on a thin plastic film which functions as a carrier for the polyester. A catalyst is utilized to enhance curing, with thickening and mold release agents included therewith. In the process, adjustable blades control the thickness and width of the resulting resin on the film. Glass fibers are continuously fed into a chopper assembly and deposited on the resin paste to complete the mixture as the resin paste is conveyed on the plastic carrier film. A second layer of resin is deposited on another carrier film that is placed on the top of the first carrier film to create a thermosetting polyester resin lamination which is fed through compaction rolls to uniformly distribute the resin and to ensure wetting of the glass. The resulting aminations are placed in a U-shaped mold while the thermosetting polyester hardens and cures.

The thicker base walls 52 in the first channel portion 50 of FIGS. 2, 3 and 5 are made by concentrating more material adjacent to the middle of the lamination than adjacent to the sides of the lamination before molding the lamination to form the first channel portion 50. The thicker second side walls 82 and 86 of FIGS. 2, 4 and 5 in the second channel portions 70 and 70' are formed by placing more material adjacent to the sides of the lamination than adjacent to the center of the lamination before molding the lamination to form the second channel portion 70.

The thickened portions 56 and 57 of the side walls 82 and 86 and thickened portion 64 of the base wall 52 of the first channel portion 50 are formed either before molding the laminations by providing extra deposits of material at locations near the opening 63 or by laying down additional layers of material to form a thicker lamination proximate the opening.

The transmission cross member 20 utilizes two channels 50 and 70 or 70', rather than the three components of the prior art steel transmission cross members, with the channels 50 and 70 or 70' adhered to one another along wall surfaces 62, 87 and 60 and 88 by an epoxy adhesive. The preferable epoxy adhesive system is PLIOFRIP® 5300 black/5330, which is a two component epoxy used for bonding advanced composite surfaces and metals with threshold limits. Maximum adhesive performances obtained when the two compounds are metered mixed and dispensed with available application equipment which delivers on-ratio, homogonous material at a constant uninterrupted rate. A cure is achieved using available heated bonding fixtures and a post cure. Bond cure efficiency varies according to the fixture type and method. The following tables 3 and 4 set forth the properties and cure characteristics of PLIOGRIP 5300 black/5330:

|  | PLIOGRIP 5300 Black Epoxy | PLIOGRIP 5330 Curative |
|---|---|---|
| Color | Black | Tan |
| Viscosity, cps; mPa s | 195,000 | 110,000 |
| Density, Lbs/Gal. (g/cm$^3$) | 9.96 (1.19) | 9.52 (1.14) |
| Ratio by Weight | 1.6 | 1 |
| Ratio by Volume | 1.5 | 1 |
| Odor | None | Amine |

|  | Environment | Time/Condition |
|---|---|---|
| Open Time | @ 23° C. (73° F.) | 25 Minutes |
| Cure Response | @ 150° C. (302° F.) | 2 Minutes |
| Temperature | @ 343/177° C. (650/350° F.) | 80 Seconds |
| Sag Resistance |  | <0.1 Inches |

The transmission cross member 20, configured using the aforedescribed materials and process for fabricating the channels 50 and 70, results in a transmission cross member which reduces the mass of the chassis employing the transmission cross member 20 by about 10 pounds. This is accomplished while minimizing the cost of the transmission cross member 20.

The transmission cross member 20 is an embodiment exemplary of structural members, such as beams, utilized in automotive vehicles or other structural members of automotive frames, wherein such beams employ the concept of nested channels made of glass-reinforced polymers, such as for example, glass-reinforced thermoset polyester polymers, with the channels adhered to with one another by epoxy.

From the foregoing description, one skilled in the art can easily ascertain the essential characteristics of this invention, and without departing form the spirit and scope thereof, can make various changes and modifications of the invention to adapt it to various usages and conditions.

We claim:

1. A hollow beam for incorporation in an automotive frame comprising:
   a first channel fabricated from a glass-reinforced polymer, the first channel having a first base wall of a selected thickness and a pair of first side walls extending transversely from the first base wall;
   a second channel fabricated from a fiberglass reinforced polymer, the second channel having a second base wall of a selected thickness and a pair of second side walls with portions of the pair of second side walls being received in a channel defined by portions of the first pair of side walls and being adhered to surfaces of the pair of second side walls to form the hollow beam.

2. The hollow beam of claim 1 wherein the glass-reinforced polymer is a thermoset polyester with chopped glass fiber strands oriented randomly within the thermoset polyester.

3. The hollow beam of claim 2 wherein the beam has a first end and a second end and wherein metal inserts are disposed adjacent to the first and second ends for attaching the beams to other vehicle frame members.

4. The hollow beam of claim 3 wherein the metal inserts each have a pair of bores extending therein and wherein the metal inserts each span the second channel and project through the second side walls of the second channel.

5. The hollow beam of claim 1 wherein the hollow beam is a transmission cross-member.

6. The hollow beam of claim 5 wherein the transmission cross-member is in combination with the frame of an automotive vehicle.

7. A hollow beam for incorporation in an automotive frame comprising:
   a first channel fabricated from a glass-reinforced polymer, the first channel having a first base wall of a selected thickness and a pair of first side walls extending transversely from the first base wall with each first side wall having a thickness less than the first base wall;
   a second channel fabricated from a fiberglass reinforced polymer, the second channel having a second base wall of a selected thickness and a pair of second side walls of a thickness less than the second base wall, and
   the second base wall having an exterior shape different from the first base wall with portions of the pair of second side walls being received in a channel defined by portions of the pair of first side walls and being adhered to inwardly facing surfaces of the pair of first side walls to form the hollow beam;
   each one of the channels being fabricated by metering the polymer onto a thin plastic film and depositing chopped glass fibers onto the polymer to form a first glass reinforced polymer layer, overlying the first layer with at least a second layer similarly configured to provide a lamination, and then molding and curing the lamination to form the channel.

8. The hollow beam of claim 7 wherein the glass-reinforced polymer is a thermoset polyester with the chopped glass fiber strands oriented randomly within the thermoset polyester.

9. The hollow beam of claim 8 wherein the beam has a first end and a second end portion and wherein metal inserts are inserted adjacent the first and second end portion for attaching the beam to other vehicle frame members.

10. The hollow beam of claim 9 wherein the metal inserts each have a pair of bores extending therethrough and wherein the metal inserts each span the second channel and project through the second side walls of the second channel.

11. The hollow beam of claim 10 wherein the hollow beam is a transmission cross-member.

12. The hollow beam of claim 11 wherein the transmission cross-member is in combination with the frame of an automotive vehicle.

13. The hollow beam of claim 7 wherein portions of at least one of the channel members are fabricated by applying additional glass reinforced polymer layers to the lamination at the portions of the laminate to thicken the channel at the portions.

14. The hollow beam of claim 13 wherein the first channel has an opening therethrough in the first base wall and wherein the first base wall and side walls have thickened portions adjacent the opening.

* * * * *